US011557272B2

(12) United States Patent
Boyce et al.

(10) Patent No.: US 11,557,272 B2
(45) Date of Patent: Jan. 17, 2023

(54) FLEXIBLE SOUND BARRIER AND RIGID MOUNTING ASSEMBLY AND MOUNTING METHOD

(71) Applicant: DEERE & COMPANY, Moline, IL (US)

(72) Inventors: Dean A. Boyce, Waterloo, IA (US); Kerry M. Cone, Bellevue, IA (US)

(73) Assignee: DEERE & COMPANY, Moline, IL (US)

( * ) Notice: Subject to any disclaimer, the term of this patent is extended or adjusted under 35 U.S.C. 154(b) by 742 days.

(21) Appl. No.: 16/534,007

(22) Filed: Aug. 7, 2019

(65) Prior Publication Data

US 2021/0043183 A1 Feb. 11, 2021

(51) Int. Cl.
*G10K 11/168* (2006.01)
*B62D 65/14* (2006.01)
(Continued)

(52) U.S. Cl.
CPC .............. *G10K 11/168* (2013.01); *B32B 3/06* (2013.01); *B32B 3/266* (2013.01); *B32B 5/02* (2013.01);
(Continued)

(58) Field of Classification Search
CPC .. B32B 5/18; B32B 5/245; B32B 7/12; B32B 27/065; B32B 27/304; B32B 37/12;
(Continued)

(56) References Cited

U.S. PATENT DOCUMENTS 3,508,371 A * 4/1970 Meyer ..................... F16B 5/126
24/295
4,172,918 A * 10/1979 Doerer ................. B60R 13/0225
296/214
(Continued)

FOREIGN PATENT DOCUMENTS

RU 5959 U1 * 2/1998

OTHER PUBLICATIONS

"Physical and Acoustic Problems Affecting Sound Quality in a Car Part Two"; published 2007; teamaudionutz.com (http://www.teamaudionutz.com/tutorial/5/Physical_And_Acoustic_Problems_Affecting_Sound_Quality_in_a_car_Part_Two). (Year: 2007).*
(Continued)

*Primary Examiner* — Cynthia L Schaller
(74) *Attorney, Agent, or Firm* — Taft Stettinius & Hollister LLP; Stephen F. Rost

(57) ABSTRACT

A flexible sound barrier and rigid mounting assembly, and a method of attaching to a vehicle. The sound barrier assembly includes a rigid substrate, and flexible noise barrier and decoupling layers. The decoupling and noise barrier layers are bonded, and an adhesive bonds the decoupling layer to the substrate. The decoupling and noise barrier layers are fixedly held in place by the substrate. The substrate can include slots that fit over mounting studs on the vehicle wall. The noise barrier and decoupling layers can include mounting holes that extend through both layers, where the mounting holes line up with the slots, and fit over the mounting studs. The assembly can be mounted on the mounting studs and stud fasteners can fit through a mounting hole without compressing the noise barrier and decoupling layers and sandwich the rigid substrate surrounding a slot between the stud fastener and the vehicle wall.

20 Claims, 2 Drawing Sheets

(51) Int. Cl.
  *B32B 37/12* (2006.01)
  *B32B 37/18* (2006.01)
  *B32B 38/00* (2006.01)
  *B60R 13/08* (2006.01)
  *B62D 33/06* (2006.01)
  *B32B 7/12* (2006.01)
  *B32B 3/06* (2006.01)
  *B32B 3/26* (2006.01)
  *B32B 5/02* (2006.01)
  *B32B 5/18* (2006.01)
  *B32B 5/24* (2006.01)
  *B32B 27/06* (2006.01)
  *B32B 27/30* (2006.01)

(52) U.S. Cl.
  CPC ............. *B32B 5/18* (2013.01); *B32B 5/245* (2013.01); *B32B 7/12* (2013.01); *B32B 27/065* (2013.01); *B32B 27/304* (2013.01); *B32B 37/12* (2013.01); *B32B 37/182* (2013.01); *B32B 38/0004* (2013.01); *B60R 13/0815* (2013.01); *B62D 65/14* (2013.01); *B32B 2250/03* (2013.01); *B32B 2255/02* (2013.01); *B32B 2255/102* (2013.01); *B32B 2266/0278* (2013.01); *B32B 2305/022* (2013.01); *B32B 2307/102* (2013.01); *B32B 2327/06* (2013.01); *B32B 2375/00* (2013.01); *B32B 2605/003* (2013.01); *B32B 2605/08* (2013.01); *B60R 2013/0807* (2013.01); *B62D 33/06* (2013.01)

(58) Field of Classification Search
  CPC ............. B32B 37/182; B32B 38/0004; B32B 2250/03; B32B 2255/02; B32B 2255/102; B32B 2266/0278; B32B 2305/022; B32B 2307/102; B32B 2327/06; B32B 2375/00; B32B 2605/003; B32B 2605/08; B32B 3/02; B32B 3/26; B32B 27/12; B32B 2262/0284; B60R 13/0815; B60R 2013/0807; B62D 65/14; B62D 33/06
  See application file for complete search history.

(56) References Cited

U.S. PATENT DOCUMENTS

| | | | |
|---|---|---|---|
| 6,550,571 | B1 | 4/2003 | Kimura et al. |
| 8,590,670 | B1* | 11/2013 | Grube .................. E04F 15/182 |
| | | | 181/294 |
| 2001/0011834 | A1* | 8/2001 | Boyce ................ B60R 13/0212 |
| | | | 296/190.09 |
| 2004/0129493 | A1 | 7/2004 | Campbell |
| 2007/0137926 | A1 | 6/2007 | Albin, Jr. et al. |
| 2008/0174149 | A1* | 7/2008 | Simms ............... B62D 33/0612 |
| | | | 296/190.02 |
| 2016/0129855 | A1* | 5/2016 | Check ................ B60R 13/0846 |
| | | | 181/290 |

OTHER PUBLICATIONS

RU5959U1 Machine Translation of Description (EPO/Google) (Year: 2022).*
RU5959U1 Machine Translation of Abstract (EPO Google) (Year: 2022).*
RU5959U1 Drawing figure from Google (Year: 2022).*

* cited by examiner

FLEXIBLE SOUND BARRIER AND RIGID MOUNTING ASSEMBLY AND MOUNTING METHOD

FIELD OF THE DISCLOSURE

The present disclosure relates to vehicle sound barriers, and more particularly to sound barriers mounted in the operator cab of a vehicle.

BACKGROUND

The operator cabs of various types of vehicles, for example agricultural vehicles, can have a sound barrier layer inside the rear wall of the cab. The material used for the sound barrier layer is typically limp and dense to act as a noise barrier in the sound path. The sound barrier layer can be decoupled from the rear wall of the cab (typically made of sheet metal) by bonding a layer of fiber to the sound barrier layer. A pressure sensitive adhesive can be applied to the fiber layer in order to mount the complete sound barrier assembly to the cab wall. The sound barrier assembly is heavy and flexible and difficult to form to the contours of the cab rear wall. The pressure sensitive adhesive allows for minimal repositioning of the sound barrier assembly after contacting the cab wall. After the sound barrier assembly has been positioned in the cab, a hand roller can be used to provide pressure through the sound barrier assembly to firmly adhere the pressure sensitive adhesive to the cab wall. The weight of the sound barrier layer of the assembly tries to fall down along the cab wall which puts the fiber layer of the assembly in shear. This shear tends to peel the pressure sensitive adhesive from the rear wall of the cab. Sheet metal brackets can be used to add shear resistance to the sound barrier assembly, and try to keep the sound barrier assembly from sliding out of position on the rear wall of the cab through the cab assembly process. Over time and vehicle use, the noise barrier assembly may slide down along the wall leaving areas without a sound barrier in the noise path.

It would be desirable to attach a sound barrier assembly to the rear wall of a vehicle cab that is easier to install and better able to stay in place during vehicle assembly and over time during vehicle use.

SUMMARY

A sound barrier assembly is disclosed for attachment to a wall of a vehicle operator cab, where the sound barrier assembly includes a rigid substrate, a noise barrier layer, a decoupling layer and an adhesive layer. The decoupling layer has first and second sides, where the first side is bonded to the noise barrier layer and the adhesive layer bonds the second side to the rigid substrate. The decoupling and noise barrier layers are fixedly held in position by the rigid substrate. The rigid substrate can be made of a formable fibrous material. The rigid substrate can include a stiffening wall around at least a portion of its perimeter. The noise barrier layer can be flexible and made of mass loaded polyvinyl chloride (PVC). The decoupling layer can be flexible and made of urethane foam.

The wall of the vehicle operator cab can include barrier mounting studs, and the rigid substrate can include slots; where each of the slots is configured to fit over one of the barrier mounting studs. When two or more of the slots are fit over two or more of the barrier mounting studs, the sound barrier assembly supports itself on the two or more barrier mounting studs. The noise barrier and decoupling layers can include mounting holes that extend through both the noise barrier and decoupling layers, where each of the mounting holes lines up with one of the slots of the rigid substrate, and fits over one of the barrier mounting studs. The sound barrier assembly can also include stud fasteners that fasten to the barrier mounting studs. When a particular stud fastener fastens to a particular barrier mounting stud that extends through a particular slot and a particular mounting hole, then the particular stud fastener fits through the particular mounting hole without compressing the noise barrier layer or decoupling layers and sandwiches the rigid substrate that surrounds the particular slot between the particular stud fastener and the wall of the vehicle operator cab. Each of the stud fasteners can include a threaded bolt that threadably attaches to one of the barrier mounting studs.

The rigid substrate can include separate left and right hand portions, the noise barrier layer can include separate left and right hand portions, the decoupling layer can include separate left and right hand portions, and the adhesive layer can include separate left and a right hand portions, where the left and right hand portions are separate. The first side of the left hand portion of the decoupling layer can be bonded to the left hand portion of the noise barrier layer, and the first side of the right hand portion of the decoupling layer can be bonded to the right hand portion of the noise barrier layer. The left hand portion of the adhesive layer can bond the second side of the left hand portion of the decoupling layer to the left hand portion of the rigid substrate. The right hand portion of the adhesive layer can bond the second side of the right hand portion of the decoupling layer to the right hand portion of the rigid substrate. The left hand portions of the decoupling and noise barrier layers can be fixedly held in position by the left hand portion of the rigid substrate, and the right hand portions of the decoupling and noise barrier layers can be fixedly held in position by the right hand portion of the rigid substrate.

A method of constructing a sound barrier assembly for attachment to a wall of a vehicle operator cab is disclosed where the method includes forming a rigid substrate to fit against the wall of the vehicle operator cab, bonding a first side of a decoupling layer to a noise barrier layer, applying an adhesive to at least one of the rigid substrate and a second side of the decoupling layer, and bonding the second side of the decoupling layer to the rigid substrate using the adhesive such that the decoupling and noise barrier layers are fixedly held in position by the rigid substrate. Forming a rigid substrate can include forming a stiffening wall around at least a portion of the perimeter of the rigid substrate. The wall of the vehicle operator cab can include barrier mounting studs; and the method can also include making slots in the rigid substrate that are sized and shaped to fit over the barrier mounting studs. The method can also include trimming the bonded noise barrier and decoupling layers to fit the rigid substrate, and making mounting holes that extend through both the noise barrier and decoupling layers, where the mounting holes line up with the slots in the rigid substrate, and are sized to fit over the barrier mounting studs.

A method of constructing a sound barrier assembly and installing the sound barrier assembly to a wall of a vehicle operator cab is disclosed where the wall includes mounting studs. The method includes forming a rigid substrate to fit against the wall of the vehicle operator cab, bonding a first side of a decoupling layer to a noise barrier layer, applying an adhesive to at least one of the rigid substrate and a second side of the decoupling layer, bonding the second side of the decoupling layer to the rigid substrate using the adhesive, hanging the bonded rigid substrate, decoupling and noise barrier layers on the wall of the vehicle operator cab using the mounting studs, and attaching the bonded rigid substrate, decoupling and noise barrier layers to the wall of the vehicle operator cab using stud fasteners. The decoupling and noise barrier layers are fixedly held in position by the rigid substrate.

Forming a rigid substrate can include forming a stiffening wall around at least a portion of the perimeter of the rigid substrate. Attaching the bonded rigid substrate, decoupling and noise barrier layers to the wall of the vehicle operator cab can include snuggly fitting the stiffening wall of the rigid substrate against the wall of the vehicle operator cab.

The method can also include making slots in the rigid substrate that are sized and shaped to fit over the mounting studs. The method can also include trimming the bonded noise barrier and decoupling layers to fit the rigid substrate, and making mounting holes that extend through both the noise barrier and decoupling layers, where the mounting holes line up with the slots in the rigid substrate, and are sized and shaped to fit over the barrier mounting studs. Hanging the bonded rigid substrate, decoupling and noise barrier layers on the wall of the vehicle operator cab can include placing slots in the rigid substrate over mounting studs. Attaching the bonded rigid substrate, decoupling and noise barrier layers to the wall of the vehicle operator cab using stud fasteners can include, for each stud fastener: placing the stud fastener on an associated barrier mounting stud, passing the stud fastener along the associated barrier mounting stud through one of the mounting holes without compressing the noise barrier or decoupling layers, and sandwiching the rigid substrate between the stud fastener and the wall of the vehicle operator cab.

The method can also include cutting the rigid substrate into separate left and right hand portions, cutting the bonded noise barrier and decoupling layers into separate left and right hand portions, bonding the second side of the left hand portion of the decoupling layer to the left hand portion of the rigid substrate using the adhesive, and bonding the second side of the right hand portion of the decoupling layer to the right hand portion of the rigid substrate using the adhesive. The method can also include hanging the bonded left hand portions of the rigid substrate, decoupling and noise barrier layers on the wall using the mounting studs, and hanging the bonded right hand portions of the rigid substrate, decoupling and noise barrier layers on the wall using the mounting studs. The method can also include attaching the bonded left hand portions of the rigid substrate, decoupling and noise barrier layers to the wall using the stud fasteners, and attaching the bonded right hand portions of the rigid substrate, decoupling and noise barrier layers to the wall using the stud fasteners.

The method can also include making slots in the left and right hand portions of the rigid substrate that are sized and shaped to fit over the barrier mounting studs. The method can also include making mounting holes in the left and right hand portions of the bonded noise barrier and decoupling layers, where the mounting holes extend through both the noise barrier and decoupling layers, line up with the slots in the rigid substrate, and are sized and shaped to fit over the barrier mounting studs. The method can also include placing the slots in the left and right hand portions of the rigid substrate over mounting studs, placing stud fasteners on the barrier mounting studs, passing the stud fasteners along the barrier mounting studs through the mounting holes without compressing the noise barrier or the decoupling layers, and sandwiching the rigid substrate between the stud fastener and the wall of the vehicle operator cab.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
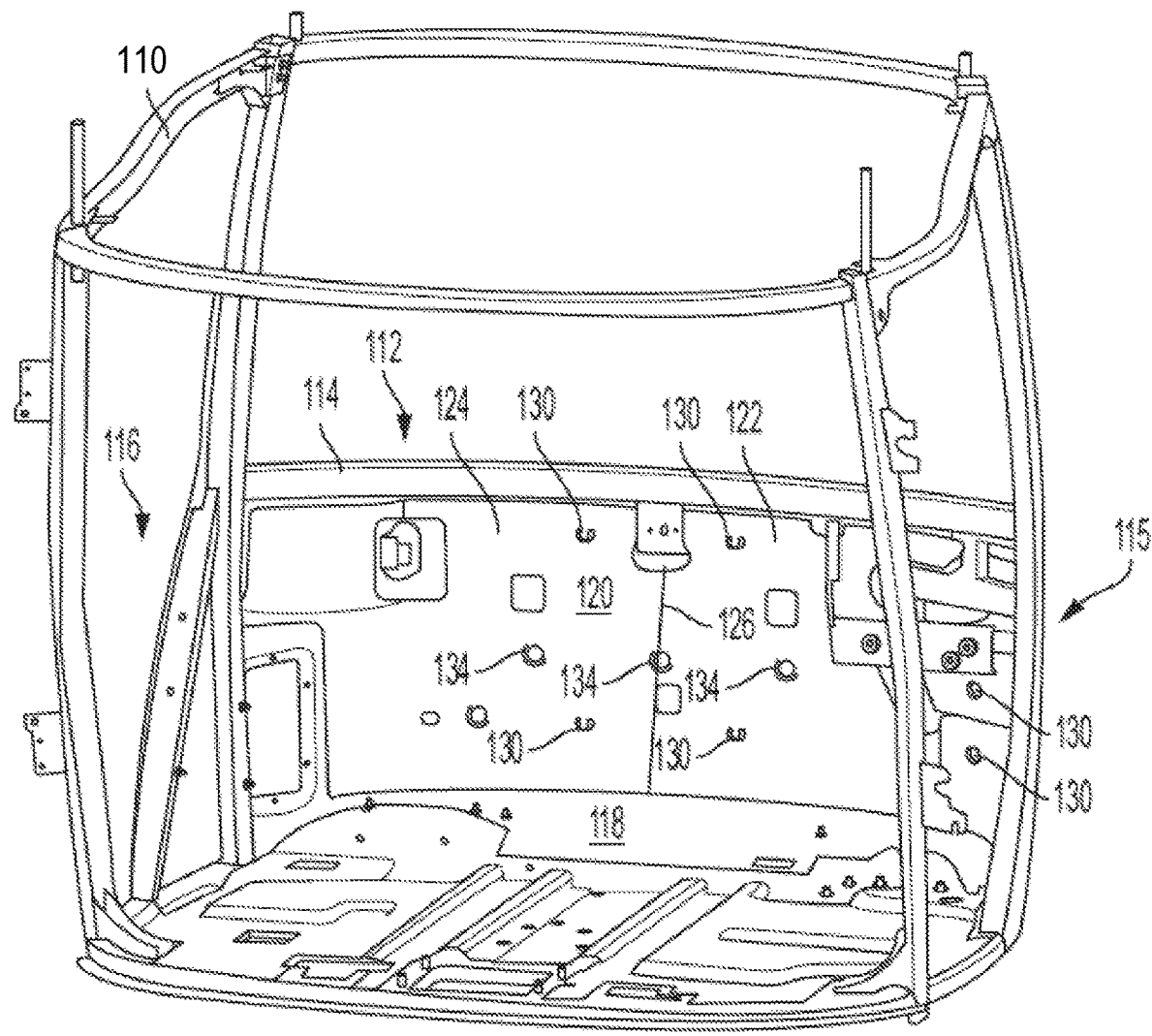
FIG. 1 illustrates an exemplary embodiment of a sound barrier assembly attached to a cab frame for an operator cab of a vehicle.

FIG. 1 illustrates an exemplary embodiment of a sound barrier assembly 120 attached to a cab frame 110 for an operator cab of a vehicle. The cab frame 110 includes a rear wall 112 which extends between a mid-frame crossbar 114, a left side frame section 115, a right side frame section 116 and a base frame section 118. One or more barrier mounting studs 130 and other mounting hardware, for example one or more wiring harness attachments 134, can be located on the rear wall 112 of the cab frame 110.

Figure 2:
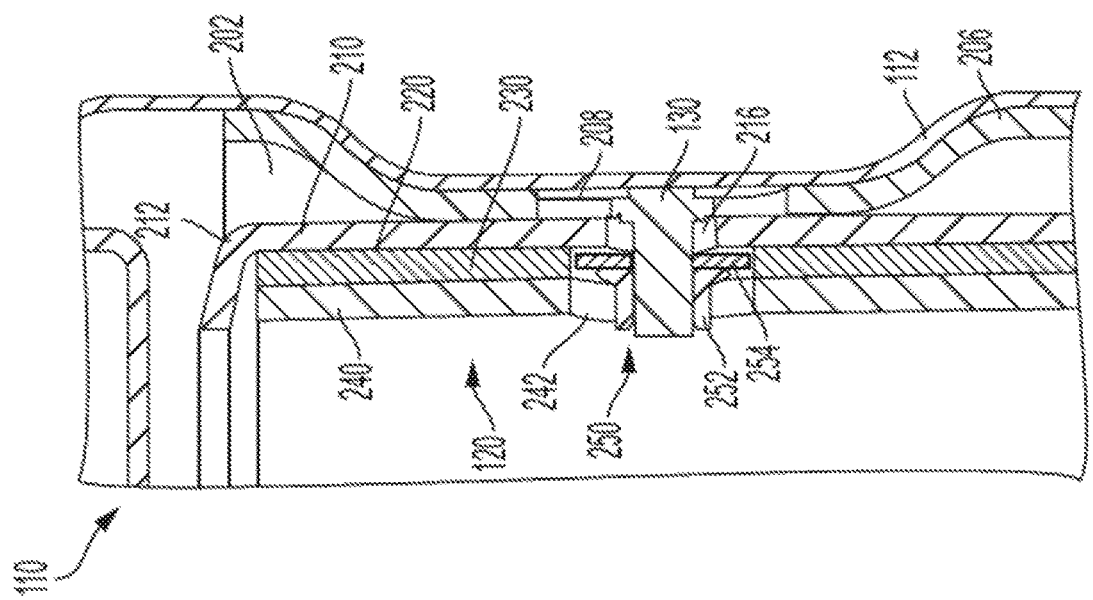
FIG. 2 illustrates a cross-section of an exemplary embodiment of the sound barrier assembly attached to the rear wall of the cab frame.

FIG. 2 illustrates a cross-section of an exemplary embodiment of the sound barrier assembly 120 attached to the rear wall 112 of the cab frame 110. The rear wall 112 is typically made of sheet metal, and can include a dampening coating 206, for example a Liquid Applied Sound Dampening (LASD) material, that is applied or sprayed on the sheet metal and heat treated to bond to the sheet metal of the rear wall 112. The dampening coating 206 can have voids 208 that are not sprayed or covered by the dampening material so that the barrier mounting studs 130 and/or other components can attach directly to the sheet metal of the rear wall 112. In this exemplary embodiment, the sound barrier assembly 120 includes a rigid substrate 210, an adhesive layer 220, a decoupling layer 230 and a noise barrier layer 240. The rigid substrate 210 can include a stiffening wall 212 around all or a portion of its perimeter, where the stiffening wall 212 can be molded during the forming of the rigid substrate 210. The rigid substrate 210 can also include a slot 216 for each of the barrier mounting studs 130 and wiring harness attachments 134. The decoupling layer 230 and noise barrier layer 240 can include mounting holes 242 that extend through both layers and line up with the slots 216 in the rigid substrate 210 for the barrier mounting studs 130. A stud fastener 250 can be configured to attach to each of the barrier mounting studs 130 to hold the sound barrier assembly 120 in place against the rear wall 112 of the cab frame 110.

The rigid substrate 210 can be made of a formable fibrous material, for example polyethylene terephthalate (PET), that is formed to a rigid shape that conforms to some or all of contours of the rear wall 112 of the cab frame 110. The substrate 210 can be trimmed to provide clearance to adjacent parts, and can have a stiffening wall 212 around the perimeter of the substrate 210. The stiffening wall 212 can be sized and shaped to fit snuggly against one or more of the mid-frame crossbar 114, left side frame section 115, right side frame section 116 and base frame section 118. The rigid substrate 210 provides a rigid surface for the sound barrier assembly 120 to be mounted against the rear wall 112. The rigid substrate 210 does not necessarily conform to every contour of the rear wall 112 of the cab frame 110, for example, FIG. 2 shows a cavity 202 formed between the rigid substrate 210 and the rear wall 112. The slots 216 to mount the substrate 210 to the rear wall 112 can be cut or drilled in the substrate 210 after it is formed.

The noise barrier layer 240 is made of a sound material, for example mass loaded polyvinyl chloride (PVC). The decoupling layer 230 is configured to have one side bonded to the rigid substrate 210, and the other side bonded to the noise barrier layer 240. The decoupling layer 230 can also be made of a material that helps with sound absorption, for example urethane foam. The barrier layer 240 can be bonded to the decoupling layer 230 to act as a single combined layer. The combined decoupling layer 230 and barrier layer 240 can then be trimmed to shape to fit the rigid substrate 210. A flat pattern can be made that is the desired shape for the combined decoupling layer 230 and barrier layer 240 to fit the rigid substrate 210. The combined decoupling layer 230 and barrier layer 240 can be laid flat on the pattern and cut to the desired shape. The mounting holes 242 can be cut in the combined decoupling layer 230 and barrier layer 240 while flat and in the desired shape. The mounting holes 242 can be made large enough to provide clearance to the stud fasteners 250 used to mount the sound barrier assembly 120 to the rear wall 112 of the cab frame 110. An adhesive bonding material that forms the adhesive layer 220 can be applied to the rigid substrate 210 and/or the exposed side of the decoupling layer 230 on the combined decoupling layer 230 and barrier layer 240. The flat trimmed combined decoupling layer 230 and barrier layer 240 can then be bonded to the rigid substrate 210 by the adhesive layer 220. The combined decoupling layer 230 and barrier layer 240 conforms to the contours of the rigid substrate 210. The mounting holes 242 in the decoupling layer 230 and the noise barrier layer 240 are positioned to line up with the slots 216 in the rigid substrate 210 when the decoupling layer 230 and the noise barrier layer 240 are bonded to the rigid substrate 210.

The barrier mounting studs 130 mounted on the rear wall 112 of the cab frame 110 are used to hang the sound barrier assembly 120 on the rear wall 112. The barrier mounting studs 130 can be weld studs welded to the rear wall 112 of the cab frame 110. Each of the slots 216 in the rigid substrate 210 is positioned to line up with one of the mounting studs 130 when the sound barrier assembly 120 is located in the desired position against the rear wall 112 of the cab frame 110. The slots 216 are large enough for the mounting studs 130 to fit through. The mounting holes 242 are preferably large enough for the mounting studs 130 and the stud fasteners 250 to fit through. Clearance holes can also be formed through the rigid substrate 210, the decoupling layer 230 and the noise barrier layer 240 for access to other mounting points on the rear wall 112, for example access to the wiring harness attachments 134. The sound barrier assembly 120 can be hung on the barrier mounting studs 130 and be self-supporting while the stud fasteners 250 are installed. The stud fasteners 250 fasten the rigid substrate 210 to the mounting studs 130 and the rear wall 112 of the cab frame 110.

The sound barrier assembly 120 can be made up of multiple pieces, for example the sound barrier assembly 120 can include a left sound barrier section 122 and a right sound barrier section 124 that meet along a seam 126. Each of the left and right sound barrier sections 122, 124 include left and right portions, respectively, of the rigid substrate 210, the adhesive layer 220, the decoupling layer 230 and the noise barrier layer 240. The left and right portions of the rigid substrate 210 can be formed separately, or the entire rigid substrate 210 can be formed and then cut along the seam 126. The combined decoupling layer 230 and noise barrier layer 240 can be trimmed to the shape of the left and right portions of the rigid substrate 210 separately, or can be trimmed to the shape of the entire rigid substrate 210 and then cut along the seam 126. Each of the left and right portions of the rigid substrate 210 include two or more slots 216 positioned to line up with the mounting studs 130 when the left and right portions 122, 124 of the sound barrier assembly 120 are located in the desired position against the rear wall 112 of the cab frame 110. The left portion of the combined decoupling layer 230 and noise barrier layer 240 includes mounting holes 242 positioned to line up with the slots 216 of the left portion of the rigid substrate 210 when the left portion of the combined decoupling layer 230 and barrier layer 240 is bonded in the desired position on the left portion of the rigid substrate 210. Similarly, the right portion of the combined decoupling layer 230 and noise barrier layer 240 includes mounting holes 242 positioned to line up with the slots 216 of the right portion of the rigid substrate 210 when the right portion of the combined decoupling layer 230 and barrier layer 240 is bonded in the desired position on the right portion of the rigid substrate 210.

The stud fastener 250 can include a nut 252 and a washer 254. Each of the mounting studs 130 can be threaded, and each of the nuts 254 of the stud fasteners 250 can be configured to screw onto an associated mounting stud 130 to attach the noise barrier assembly 120 to the rear wall 112 of the cab frame 110. The stud fasteners 250 and the mounting holes 242 in the decoupling layer 230 and the barrier layer 240 are sized so that the stud fasteners 250 do not compress or pinch the decoupling layer 230 and the noise barrier layer 240. If the stud fasteners 250 pinch the sound barrier 240 or the decoupling layer 230, the noise barrier assembly 120 is no longer decoupled because the decoupling layer 230 is compressed and not allowed to move independently of the rigid substrate 210 and the cab frame 110. The effectiveness of the noise barrier assembly 120 is reduced when it is not decoupled from the rigid substrate 210.

When the stud fastener 250 is attached to the associated mounting stud 130, the rigid substrate 210 is sandwiched between the stud fastener 250 and the rear wall 112 on the associated mounting stud 130. When the stud fastener 250 includes a nut 252 and a washer 254, the washer 254 is placed over the mounting stud 130 after the sound barrier assembly 120 and before the nut 252, so the washer 254 is sandwiched between the nut 252 and the rigid substrate 210 on the associated mounting stud 130 when the stud fastener 250 is attached to the associated mounting stud 130. In embodiments where the slots 216 and the mounting holes 242 have a generally circular shape, the diameter of the mounting holes 242 are larger than the diameter of the slots 216, and the outside diameter of the stud fasteners 250 are smaller than the diameter of the mounting holes 242 and larger than the diameter of the slots 216. In this case, when a particular stud fastener 250 is fastened to a particular barrier mounting stud 130 that extends through a particular slot 216 and a particular mounting hole 242, then the particular stud fastener 250 fits through the particular mounting hole 242 without compressing the noise barrier layer 240 and the decoupling layer 230 and sandwiches the rigid substrate 210 that surrounds the particular slot 216 between the particular stud fastener 250 and the wall 112 of the cab frame 110.

The mounting holes 242 in the decoupling layer 230 and the noise barrier layer 240 are larger than the slots 216 in the rigid substrate 210, and slightly larger than the stud fasteners 250 so that the stud fasteners 250 do not compress or pinch the decoupling layer 230 and the noise barrier layer 240 when the stud fasteners 250 are attached to the associated mounting studs 130. The decoupling layer 230 and the noise barrier layer 240 surround the stud fastener 250, as shown in FIG. 2, but are not sandwiched between the stud fastener 250 and the rigid substrate 210 when the stud fastener 250 is attached to the associated mounting stud 130.

Figure 3:
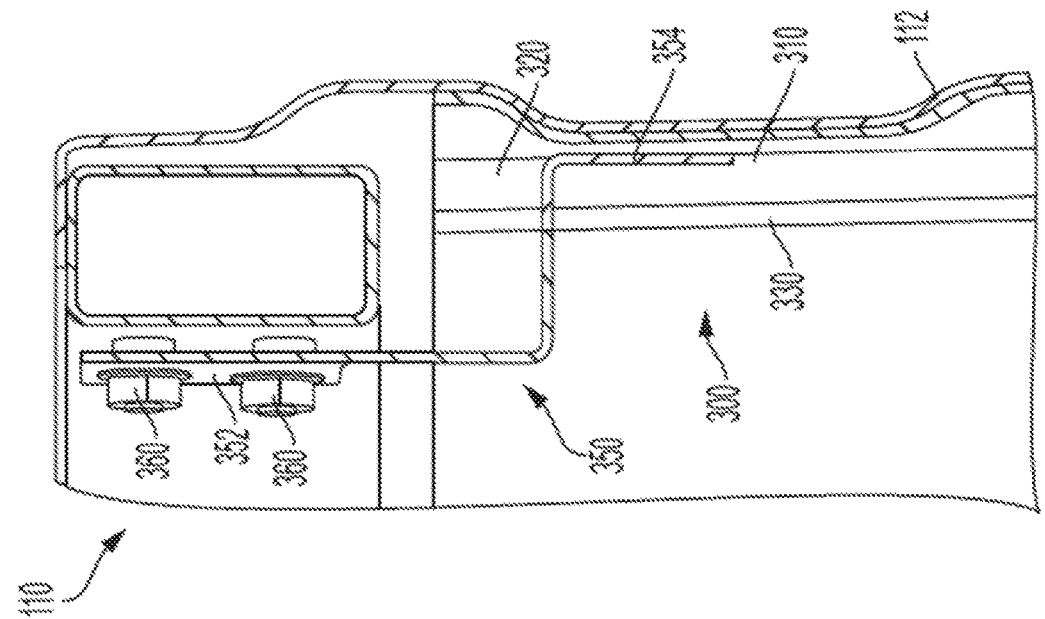
FIG. 3 illustrates a prior sound barrier assembly attached to the rear wall of a cab frame.

In contrast, FIG. 3 shows a prior noise barrier assembly 300 attached to the rear wall 112 of a cab frame 110. The prior noise barrier assembly 300 includes a pressure sensitive adhesive layer 310, a lofted fiber decoupling layer 320 and a barrier layer 330. The lofted fiber decoupling layer 320 and the barrier layer 330 are attached to one another using an adhesive. On the cab assembly line, a pressure sensitive adhesive is applied to the rear wall 112 and/or the exposed side of the lofted fiber decoupling layer 320 to form the adhesive layer 310. The combined fiber decoupling layer 320 and barrier layer 330 are then positioned on the rear wall 112 and pressure applied, for example by hand rolling, to contact and attach the decoupling layer 320 to the rear wall 112 using the pressure sensitive adhesive of the adhesive layer 310. The weight of the combined fiber decoupling layer 320 and barrier layer 330 makes the prior noise barrier assembly 300 tend to slide down the rear wall 112, and the fiber decoupling layer 320 tends to shear from the weight of the barrier layer 330. One or more retaining clamps 350 can be attached to the cab frame 110 to try and help keep the prior noise barrier assembly 300 from tending to slide down the rear wall 112. A proximal end 352 of the retaining clamp 350 is attached to the cab frame 110 using bolts 360, and a distal end 354 of the retaining clamp 350 compresses the fiber decoupling layer 320 and the barrier layer 330 against the rear wall 112 of the cab 110. Thus, installation of the prior noise barrier assembly 300 on the cab assembly line requires applying and working with pressure sensitive adhesives to mount the combined fiber decoupling layer 320 and barrier layer 330 on the rear wall 112; and also installing additional brackets 350 to compress the prior noise barrier assembly 300 and hold it in place during the cab assembly process.

The sound barrier assembly 120 disclosed herein provides a noise barrier in the sound path that is decoupled from the ridged substrate 210 and that is mounted directly to the rear wall 112 of the cab frame 110. On the cab assembly line, installation of the sound barrier is simplified by only requiring hanging of the sound barrier assembly 120 on the barrier mounting studs 130 and then the sound barrier assembly 120 is self-supporting in position while attaching the stud fasteners 250. The rigid substrate 210 supports the decoupling layer 230 and the noise barrier layer 240 in a relative fixed position. The issues of working with parts mounted with pressure sensitive adhesives on the cab assembly line are eliminated. There is no need for additional brackets to hold the sound barrier assembly 120 in place during cab assembly because the sound barrier assembly 120 is already mounted on and supported by the ridged substrate 210, and is shaped to the contours of the cab frame 110.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A sound barrier assembly for attachment to a wall of a vehicle operator cab, where the wall of the vehicle operator cab includes a plurality of barrier mounting studs, the sound barrier assembly comprising:
    a rigid substrate that includes a plurality of slots and each of the plurality of slots is configured to fit over one of the plurality of barrier mounting studs;
    a noise barrier layer;
    a decoupling layer with a first side and a second side, the first side opposite the second side, and the first side of the decoupling layer bonded to the noise barrier layer; and
    an adhesive layer configured to bond the second side of the decoupling layer to the rigid substrate;
    a plurality of stud fasteners, each of the plurality of stud fasteners configured to fasten to one of the plurality of barrier mounting studs;
    wherein the decoupling and noise barrier layers are fixedly held in position by the rigid substrate;
    wherein the noise barrier and decoupling layers comprise a plurality of mounting holes that extend through both the noise barrier and decoupling layers, each of the plurality of mounting holes configured to line up with one of the plurality of slots of the rigid substrate, and each of the plurality of mounting holes configured to fit over one of the plurality of barrier mounting studs;
    wherein when a particular stud fastener of the plurality of stud fasteners fastens to a particular barrier mounting stud of the plurality of barrier mounting studs that extends through a particular slot of the plurality of slots and a particular mounting hole of the plurality of mounting holes, then the particular stud fastener fits through the particular mounting hole without compressing the noise barrier or decoupling layers and sandwiches the rigid substrate that surrounds the particular slot between the particular stud fastener and the wall of the vehicle operator cab.

2. The sound barrier assembly of claim 1, wherein the rigid substrate is made of a formable fibrous material.

3. The sound barrier assembly of claim 2, wherein the rigid substrate includes a stiffening wall around at least a portion of a perimeter of the rigid substrate.

4. The sound barrier assembly of claim 1, wherein the noise barrier layer is flexible and made of mass loaded polyvinyl chloride (PVC), and the decoupling layer is flexible and made of urethane foam.

5. The sound barrier assembly of claim 1,
    wherein when two or more of the plurality of slots are fit over two or more of the plurality of barrier mounting studs, the sound barrier assembly supports itself on the two or more of the plurality of barrier mounting studs.

6. The sound barrier assembly of claim 1, wherein each of the plurality of stud fasteners comprises a threaded bolt configured to threadably attach to one of the plurality of barrier mounting studs.

7. The sound barrier assembly of claim 1, wherein:
the rigid substrate comprises a left hand portion and a right hand portion, where the left and right hand portions of the rigid substrate are separate and are configured to meet together along a seam;
the noise barrier layer comprises a left hand portion and a right hand portion, where the left and right hand portions of the noise barrier layer are separate and are configured to meet together along the seam;
the decoupling layer comprises a left hand portion and a right hand portion, where the left and right hand portions of the decoupling layer are separate and are configured to meet together along the seam; and
the adhesive layer comprises a left hand portion and a right hand portion, where the left and right hand portions of the adhesive layer are separate and are configured to meet together along the seam; and
wherein the first side of the left hand portion of the decoupling layer is bonded to the left hand portion of the noise barrier layer, and the first side of the right hand portion of the decoupling layer is bonded to the right hand portion of the noise barrier layer;
wherein the left hand portion of the adhesive layer bonds the second side of the left hand portion of the decoupling layer to the left hand portion of the rigid substrate, and the right hand portion of the adhesive layer bonds the second side of the right hand portion of the decoupling layer to the right hand portion of the rigid substrate; and
wherein the left hand portions of the decoupling and noise barrier layers are fixedly held in position by the left hand portion of the rigid substrate, and the right hand portions of the decoupling and noise barrier layers are fixedly held in position by the right hand portion of the rigid substrate; and
wherein when the sound barrier assembly is attached to the wall of the vehicle then the left hand portions of the decoupling, noise barrier and adhesive layers and the rigid substrate meet together with the right hand portions of the decoupling, noise barrier and adhesive layers and the rigid substrate along the seam.

8. The sound barrier assembly of claim 7, wherein
at least two of the plurality of slots are on the left hand portion of the rigid substrate and at least two of the plurality of slots are on the right hand portion of the rigid substrate;
wherein when two or more of the plurality of slots on the left hand portion of the rigid substrate are fit over a first two or more of the plurality of barrier mounting studs, the left hand portions of the noise barrier and decoupling layers are fixedly held in position by the left hand portion of the rigid substrate on the first two or more of the plurality of barrier mounting studs;
wherein when two or more of the plurality of slots on the right hand portion of the rigid substrate are fit over a second two or more of the plurality of barrier mounting studs, the right hand portions of the noise barrier and decoupling layers are fixedly held in position by the right hand portion of the rigid substrate on the second two or more of the plurality of barrier mounting studs; and wherein when the sound barrier assembly is attached to the wall of the vehicle operator cab then the left hand portions of the decoupling and noise barrier layers and the rigid substrate meet together with the right hand portions of the decoupling and noise barrier layers and the rigid substrate along the seam.

9. The sound barrier assembly of claim 1, wherein each of the plurality of slots has a first diameter, and each of the plurality of mounting holes has a second diameter, where the second diameter is greater that the first diameter.

10. The sound barrier assembly of claim 9, wherein an outside diameter of each of the plurality of stud fasteners is smaller than the second diameter to fit through the mounting holes without compressing the noise barrier or decoupling layers, and the outside diameter of each of the plurality of stud fasteners is larger than the first diameter to sandwich the rigid substrate that surrounds the slots between the stud fastener and the wall of the vehicle operator cab.

11. A method of constructing a sound barrier assembly for attachment to a wall of a vehicle operator cab, where the wall of the vehicle operator cab includes a plurality of mounting studs, the method comprising:
forming a rigid substrate with a plurality of slots having a first diameter, where the rigid substrate is configured to fit against the wall of the vehicle operator cab and each of the plurality of slots is configured to fit over one of the plurality of mounting studs;
bonding a first side of a decoupling layer to a noise barrier layer;
forming a plurality of mounting holes with a second diameter that extend through both the noise barrier and decoupling layers, where the second diameter is larger than the first diameter;
applying an adhesive to at least one of the rigid substrate and a second side of the decoupling layer, where the second side of the decoupling layer is opposite of the first side of the decoupling layer;
bonding the second side of the decoupling layer to the rigid substrate using the adhesive to fixedly hold the decoupling and noise barrier layers in position by the rigid substrate where each of the plurality of mounting holes lines up with one of the plurality of slots of the rigid substrate and is configured to fit over one of the plurality of mounting studs; and
selecting a plurality of stud fasteners configured to fasten to the plurality of mounting studs such that when a particular stud fastener of the plurality of stud fasteners fastens to a particular mounting stud of the plurality of mounting studs that extends through a particular slot of the plurality of slots and a particular mounting hole of the plurality of mounting holes, then the particular stud fastener fits through the particular mounting hole without compressing the noise barrier or decoupling layers and sandwiches the rigid substrate that surrounds the particular slot between the particular stud fastener and the wall of the vehicle operator cab.

12. The method of claim 11, wherein forming a rigid substrate comprises forming a stiffening wall around at least a portion of a perimeter of the rigid substrate.

13. The method of claim 11, wherein the
plurality of slots in the rigid substrate and the plurality of mounting holes that extend through both the noise barrier and decoupling layers have a circular shape.

14. The method of claim 13, further comprising:
trimming the bonded noise barrier and decoupling layers to fit the rigid substrate.

15. A method of constructing a sound barrier assembly and installing the sound barrier assembly to a wall of a vehicle operator cab where the wall includes a plurality of mounting studs, the method comprising:

forming a rigid substrate to fit against the wall of the vehicle operator cab;

making a plurality of slots in the rigid substrate; each of the plurality of slots sized and shaped to fit over one of the plurality of mounting studs;

bonding a first side of a decoupling layer to a noise barrier layer;

making a plurality of mounting holes that extend through both the noise barrier and decoupling layers, where each of the plurality of mounting holes is positioned to line up with one of the plurality of slots in the rigid substrate, and each of the plurality of mounting holes is sized and shaped to fit over one of the plurality of mounting studs; and applying an adhesive to at least one of the rigid substrate and a second side of the decoupling layer, where the second side of the decoupling layer is opposite of the first side of the decoupling layer;

bonding the second side of the decoupling layer to the rigid substrate using the adhesive;

hanging the bonded rigid substrate, decoupling and noise barrier layers on the wall of the vehicle operator cab by placing the plurality of slots in the rigid substrate over the plurality of mounting studs, the decoupling and noise barrier layers being fixedly held in position by the rigid substrate; and attaching the bonded rigid substrate, decoupling and noise barrier layers to the wall of the vehicle operator cab using a plurality of stud fasteners;

wherein attaching the bonded rigid substrate, decoupling and noise barrier layers to the wall of the vehicle operator cab using a plurality of stud fasteners comprises, for each stud fastener of the plurality of stud fasteners:

placing the stud fastener on an associated mounting stud of the plurality of mounting studs;

passing the stud fastener along the associated mounting stud through one of the mounting holes of the plurality of mounting holes without compressing the noise barrier layer or the decoupling layer; and sandwiching the rigid substrate between the stud fastener and the wall of the vehicle operator cab.

16. The method of claim 15, wherein forming a rigid substrate comprises forming a stiffening wall around at least a portion of a perimeter of the rigid substrate; and wherein attaching the bonded rigid substrate, decoupling and noise barrier layers to the wall of the vehicle operator cab comprises snuggly fitting the stiffening wall of the rigid substrate against the wall of the vehicle operator cab.

17. The method of claim 15, further comprising trimming the bonded noise barrier and decoupling layers to fit the rigid substrate.

18. The method of claim 15, further comprising:

cutting the rigid substrate into two separate portions along a substrate seam to form a left hand portion of the rigid substrate and a right hand portion of the rigid substrate;

cutting the bonded noise barrier and decoupling layers into two separate portions along a layer seam to form a left hand portion of the bonded noise barrier and decoupling layers and a right hand portion of the bonded noise barrier and decoupling layers;

wherein applying an adhesive to at least one of the rigid substrate and a second side of the decoupling layer comprises applying the adhesive to at least one of the left hand portion of the rigid substrate and the second side of the left hand portion of the decoupling layer, and applying the adhesive to at least one of the right hand portion of the rigid substrate and the second side of the right hand portion of the decoupling layer;

wherein bonding the second side of the decoupling layer to the rigid substrate using the adhesive comprises bonding the second side of the left hand portion of the decoupling layer to the left hand portion of the rigid substrate using the adhesive, and bonding the second side of the right hand portion of the decoupling layer to the right hand portion of the rigid substrate using the adhesive; and wherein hanging the bonded rigid substrate, decoupling and noise barrier layers on the wall of the vehicle operator cab using the plurality of mounting studs comprises hanging the bonded left hand portions of the rigid substrate, decoupling and noise barrier layers on the wall using the plurality of mounting studs, and hanging the bonded right hand portions of the rigid substrate, decoupling and noise barrier layers on the wall using the plurality of mounting studs such that the left and right hand portions of the rigid substrate meet together along the substrate seam and the left and right hand portions of the bonded noise barrier and decoupling layers meet together along the layer seam; and wherein attaching the bonded rigid substrate, decoupling and noise barrier layers to the wall of the vehicle operator cab using a plurality of stud fasteners comprises attaching the bonded left hand portions of the rigid substrate, decoupling and noise barrier layers to the wall using the plurality of stud fasteners, and attaching the bonded right hand portions of the rigid substrate, decoupling and noise barrier layers to the wall using the plurality of stud fasteners such that the left and right hand portions of the rigid substrate meet together along the substrate seam and the left and right hand portions of the bonded noise barrier and decoupling layers meet together along the layer seam.

19. The method of claim 15, wherein each of the plurality of slots has a first diameter, and each of the plurality of mounting holes has a second diameter, where the second diameter is greater that the first diameter; and wherein an outside diameter of each of the plurality of stud fasteners is smaller than the second diameter and larger than the first diameter; and wherein attaching the bonded rigid substrate, decoupling and noise barrier layers to the wall of the vehicle operator cab using a plurality of stud fasteners comprises, for each stud fastener of the plurality of stud fasteners:

passing the stud fastener along an associated mounting stud of the plurality of mounting studs within the second diameter of an associated mounting hole of the plurality of mounting holes without compressing the noise barrier layer or the decoupling layer; and sandwiching the rigid substrate that surrounds the first diameter of an associated slot of the plurality of slots of the rigid substrate between the stud fastener and the wall of the vehicle operator cab.

20. The method of claim 15, further comprising:

cutting the bonded rigid substrate, decoupling and noise barrier layers into two separate portions along a seam to form a left hand portion of the bonded rigid substrate, decoupling and noise barrier layers and a right hand portion of the bonded rigid substrate, decoupling and noise barrier layers;

wherein hanging the bonded rigid substrate, decoupling and noise barrier layers on the wall of the vehicle operator cab using the plurality of mounting studs comprises hanging the bonded left and right hand portions of the bonded rigid substrate, decoupling and noise barrier layers on the wall using the plurality of mounting studs such that the left and right hand portions of the bonded rigid substrate, decoupling and noise barrier layers meet together along the seam; and wherein attaching the bonded rigid substrate, decoupling and noise barrier layers to the wall of the vehicle operator cab using the plurality of stud fasteners comprises attaching the bonded left hand portions of the bonded rigid substrate, decoupling and noise barrier layers to the wall using the plurality of stud fasteners such that the left and right hand portions of the bonded rigid substrate, decoupling and noise barrier layers meet together along the seam.

\* \* \* \* \*